US012716490B2

(12) United States Patent
Drolet et al.

(10) Patent No.: US 12,716,490 B2
(45) Date of Patent: Aug. 25, 2026

(54) SEAL ASSEMBLY WITH ANTI-ROTATION FEATURE

(71) Applicant: Pratt & Whitney Canada Corp., Longueuil (CA)

(72) Inventors: Martin Drolet, Saint-Amable (CA); Melanie Brillant, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/088,264

(22) Filed: Dec. 23, 2022

(65) Prior Publication Data

US 2024/0209942 A1 Jun. 27, 2024

(51) Int. Cl.
*F16J 9/24* (2006.01)
*F16J 9/20* (2006.01)
*F16J 15/3272* (2016.01)

(52) U.S. Cl.
CPC . *F16J 9/24* (2013.01); *F16J 9/20* (2013.01); *F16J 15/3272* (2013.01)

(58) Field of Classification Search
CPC ............... F16J 9/24; F16J 6/20; F16J 15/3272
See application file for complete search history.

(56) References Cited

U.S. PATENT DOCUMENTS 1,277,291 A * 8/1918 Canfield .................... F16J 9/16 277/446
1,336,670 A * 4/1920 Anderson .................. F16J 9/06 277/474
1,360,535 A * 11/1920 Kelly ......................... F16J 9/24 277/486
1,750,381 A * 3/1930 Baker ........................ F16J 9/14 277/446
1,847,731 A * 3/1932 Solenberger ............... F16J 1/06 277/485
1,861,716 A * 6/1932 Petre .......................... F16J 9/14 277/492
2,085,457 A * 6/1937 Westerhouse ............. F16J 9/14 277/485
2,117,986 A * 5/1938 Robertson ................ F16J 9/063 277/485

(Continued)

FOREIGN PATENT DOCUMENTS

JP S612974 A 1/1986
JP 2011112202 A 6/2011
JP 2011163430 A 8/2011

*Primary Examiner* — Vishal A Patel
(74) *Attorney, Agent, or Firm* — Getz Balich LLC

(57) ABSTRACT

A piston seal assembly includes a ring and a seal. The ring includes a ring body. The ring body extends circumferentially about a centerline axis. The ring body extends circumferentially between a first circumferential ring end and a second circumferential ring end. The ring body forms a ring end gap between the first circumferential ring end and the second circumferential ring end. The seal includes a seal body. The seal body extends circumferentially about the centerline axis. The seal body extends circumferentially between a first circumferential seal end and a second circumferential seal end. The seal body forms a seal end gap between the first circumferential seal end and the second circumferential seal end. The ring body and the seal body form an anti-rotation feature of the piston seal assembly. The anti-rotation feature configured to limit relative circumferential movement between the ring body and the seal body.

6 Claims, 6 Drawing Sheets

(56) References Cited

U.S. PATENT DOCUMENTS

| | | | | |
|---|---|---|---|---|
| 2,283,056 | A * | 5/1942 | Guardiola | F16J 9/203 277/449 |
| 2,300,518 | A * | 11/1942 | Phillips | F16J 9/24 277/446 |
| 2,481,553 | A * | 9/1949 | Williams | F16J 9/24 277/449 |
| 2,757,057 | A * | 7/1956 | Sanon | F16J 9/16 277/489 |
| 3,295,857 | A * | 1/1967 | Lutz | F16J 9/063 277/488 |
| 3,333,855 | A * | 8/1967 | Andresen | F16J 15/30 277/503 |
| 3,391,943 | A * | 7/1968 | Riley | F16J 9/063 277/488 |
| 3,481,612 | A * | 12/1969 | Sampson | F16J 9/16 277/446 |
| 3,967,829 | A * | 7/1976 | Rogers | F16L 27/1017 277/589 |
| 4,111,438 | A * | 9/1978 | Longfoot | F16J 9/06 277/469 |
| 4,358,121 | A | 11/1982 | Sand | |
| 4,883,029 | A | 11/1989 | Winston | |
| 4,962,691 | A * | 10/1990 | Kanao | F16J 9/24 123/193.6 |
| 5,009,519 | A * | 4/1991 | Tatum | F16J 15/344 384/94 |
| 6,457,721 | B1 | 10/2002 | Bloemers | |
| 6,755,025 | B2 * | 6/2004 | Eleftheriou | F04D 27/023 60/795 |
| 9,752,679 | B2 * | 9/2017 | Urac | F16J 9/06 |
| 9,856,983 | B2 | 1/2018 | Koop | |
| 10,436,322 | B2 | 10/2019 | Svrcek | |
| 2017/0241281 | A1 * | 8/2017 | Treat | F16J 15/3272 |
| 2019/0211931 | A1 * | 7/2019 | Finders | F16J 15/3436 |

* cited by examiner

SEAL ASSEMBLY WITH ANTI-ROTATION FEATURE

TECHNICAL FIELD

This disclosure relates generally to bleed air systems for gas turbine engines and, more particularly, to seal assemblies for bleed air system components.

BACKGROUND OF THE ART

Fluid flow control components, such as compressor bleed-off valves used for aircraft gas turbine engines, may include one or more piston seal assemblies. Various piston seal assemblies are known in the art for facilitating piston sealing. While these known assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a piston seal assembly includes a ring and a seal. The ring includes a ring body. The ring body extends circumferentially about a centerline axis of the piston seal assembly. The ring body extends circumferentially between and to a first circumferential ring end and a second circumferential ring end. The ring body forms a ring end gap of the ring between the first circumferential ring end and the second circumferential ring end. The seal includes a seal body in contact with the ring body. The seal body extends circumferentially about the centerline axis. The seal body extends circumferentially between and to a first circumferential seal end and a second circumferential seal end. The seal body forms a seal end gap of the seal between the first circumferential seal end and the second circumferential seal end. The ring body and the seal body form an anti-rotation feature of the piston seal assembly. The anti-rotation feature configured to limit relative circumferential movement between the ring body and the seal body.

In any of the aspects or embodiments described above and herein, the ring end gap may be circumferentially offset from the seal end gap by an offset angle Θ.

In any of the aspects or embodiments described above and herein, the offset angle Θ may be between 160 degrees and 200 degrees.

In any of the aspects or embodiments described above and herein, the seal body may radially circumscribe the ring body.

In any of the aspects or embodiments described above and herein, the ring body may form a protrusion of the anti-rotation feature, and the protrusion may be disposed within the seal end gap.

In any of the aspects or embodiments described above and herein, the seal body may form a protrusion of the anti-rotation feature, and the protrusion may be disposed within the ring end gap.

In any of the aspects or embodiments described above and herein, the ring body may form a protrusion of the anti-rotation feature, the seal body may form a recess of the anti-rotation feature, and the protrusion may be disposed within the recess.

In any of the aspects or embodiments described above and herein, the protrusion is may be disposed at the first ring end.

In any of the aspects or embodiments described above and herein, the seal body may form a protrusion of the anti-rotation feature, the ring body may form a recess of the anti-rotation feature, and the protrusion may be disposed within the recess.

In any of the aspects or embodiments described above and herein, the protrusion may be disposed at the first seal end.

In any of the aspects or embodiments described above and herein, the piston seal assembly may further include a piston. The piston may include a piston body including an outer diameter surface. The piston body may form an annular seal groove through the outer diameter surface. The ring and the seal may be disposed within the annular seal groove. The piston body may form a tab of the anti-rotation feature, the seal body may form a slot of the anti-rotation feature, and the tab may be disposed within the slot.

In any of the aspects or embodiments described above and herein, the piston seal assembly may further include a piston. The piston may include a piston body including an outer diameter surface. The piston body may form an annular seal groove through the outer diameter surface. The ring and the seal may be disposed within the annular seal groove. The piston body may form a tab of the anti-rotation feature, the ring body may form slot of the anti-rotation feature, and the tab may be disposed within the slot.

In any of the aspects or embodiments described above and herein, the ring body may include a first body material, the seal body may include a second body material, and the first body material may be different than the second body material.

In any of the aspects or embodiments described above and herein, the ring end gap may have a first circumferential position. The seal end gap may have a second circumferential position. The anti-rotation feature may be configured to limit relative motion between the first circumferential position and the second circumferential position within a threshold rotation limit.

In any of the aspects or embodiments described above and herein, the threshold rotation limit may include a range of ten degrees (10°).

In any of the aspects or embodiments described above and herein, a range of the threshold rotation limit may be based on a magnitude of the offset angle Θ.

According to another aspect of the present disclosure, a bleed-off valve for an aircraft gas turbine engine includes a housing, a piston, and a piston seal assembly. The housing extends circumferentially about a centerline axis of the bleed-off valve. The piston is disposed within the housing. The piston is configured to translate along the centerline axis. The piston includes a piston body forming an annular seal groove. The piston seal assembly includes a ring, a seal, and an anti-rotation feature. The ring includes a ring body disposed within the annular seal groove. The ring body forms a ring end gap of the ring at a first circumferential position. The seal forms a fluid seal between the piston and the housing. The seal includes a seal body disposed within the annular seal groove radially outside of the ring body. The seal body forms a seal end gap of the seal at a second circumferential position different than the first circumferential position. The anti-rotation feature is positioned to limit relative circumferential movement between the ring body and the seal body.

In any of the aspects or embodiments described above and herein, the ring end gap at the first circumferential position may be circumferentially offset from the seal end gap at the second circumferential position by an offset angle Θ. The offset angle Θ may be between 160 degrees and 200 degrees.

According to another aspect of the present disclosure, a piston seal assembly includes a ring and a seal. The ring includes a ring body. The ring body extends circumferentially about a centerline axis of the piston seal assembly. The ring body forms a ring end gap of the ring. The seal includes a seal body in contact with the ring body. The seal body extends circumferentially about the centerline axis. The seal body forms a seal end gap of the seal. The ring body and the seal body form an anti-rotation feature of the piston seal assembly. The anti-rotation feature is configured to allow relative circumferential movement between the ring end gap and the seal end gap to a threshold rotation limit. The threshold rotation limit includes a range of ten degrees (10°).

In any of the aspects or embodiments described above and herein, the anti-rotation feature may include a protrusion of one of the ring body or the seal body.

The present disclosure, and all its aspects, embodiments and advantages associated therewith will become more readily apparent in view of the detailed description provided below, including the accompanying drawings.

DETAILED DESCRIPTION

Figure 1:
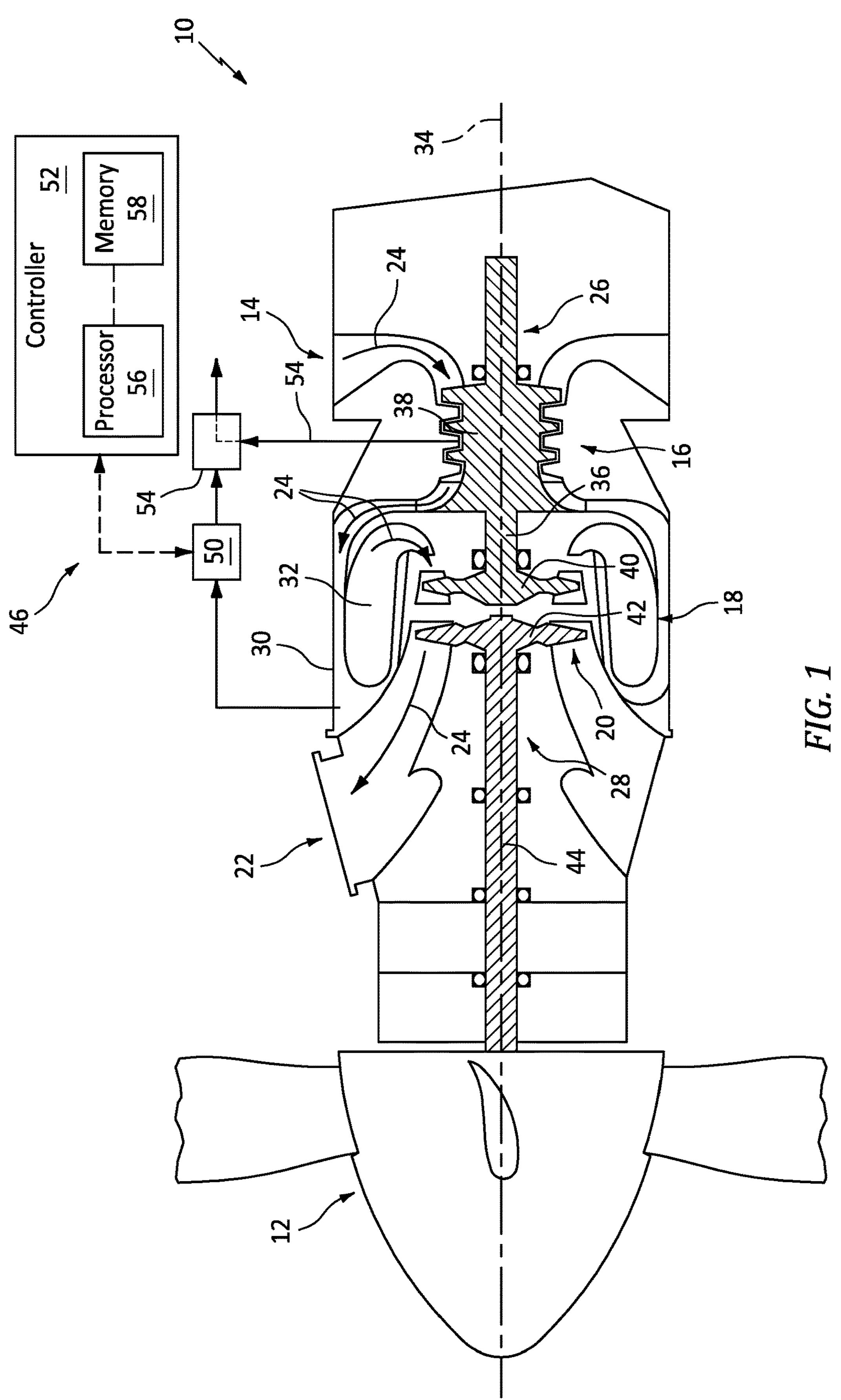
FIG. 1 illustrates a schematic view of a gas turbine engine, in accordance with one or more embodiments of the present disclosure.

FIG. 1 schematically illustrates a gas turbine engine 10. The gas turbine engine 10 of FIG. 1 is a multi-spool turboprop engine. However, while the following description and accompanying drawings refer to a turboprop engine as an example, it should be understood that aspects of the present disclosure may be equally applicable to other types of gas turbine engines including, but not limited to, a turboshaft gas turbine engine, a turbofan gas turbine engine, or a turbojet gas turbine engine. The gas turbine engine 10 of FIG. 1 is configured to drive (e.g., apply a rotational force to) a propeller 12. This gas turbine engine 10 includes an air inlet 14, a compressor section 16, a combustor section 18, a turbine section 20, and an exhaust outlet 22. The compressor section 16 drives air from the air inlet 14 along a core flow path 24 for compression and communication into the combustor section 18 and then expansion through the turbine section 20.

The gas turbine engine 10 of FIG. 1 includes a first rotational assembly 26 (e.g., a high-pressure spool), a second rotational assembly 28 (e.g., a power spool), an engine static structure 30 (e.g., an engine case), and an annular combustor 32. The first rotational assembly 26 and the second rotational assembly 28 are mounted for rotation about an axial centerline 34 (e.g., a rotational axis) of the gas turbine engine 10 relative to the engine static structure 30. The first rotational assembly 26 includes a first shaft 36, a bladed first compressor rotor 38, and a bladed first turbine rotor 40. The first shaft 36 interconnects the bladed first compressor rotor 38 and the bladed first turbine rotor 40. The second rotational assembly 28 includes a bladed second turbine rotor 42 and a second shaft 44. The bladed second turbine rotor 42 is connected to the second shaft 44. The annular combustor 32 is disposed between the bladed first compressor rotor 38 and the bladed first turbine rotor 40 along the core flow path 24. In operation, airflow along the core flow path 24 is compressed by the bladed first compressor rotor 38, mixed and burned with fuel in the combustor 32, and then expanded through the bladed first turbine rotor 40 and the bladed second turbine rotor 42. The bladed first turbine rotor 40 and the bladed second turbine rotor 42 rotationally drive the first rotational assembly 26 and the second rotational assembly 28, respectively, in response to the expansion of the combustion gas. The combustion gas may then exit the gas turbine engine 10 through the exhaust outlet 22.

The first rotational assembly 26 and the second rotational assembly 28 of FIG. 1 are mechanically independent of one another so that they may rotate at different speeds and/or in opposite directions. The air flow through the gas turbine engine 10 of FIG. 1 along the core flow path 24 is directed in an aft-to-forward direction, where the air inlet 14 may be disposed in a portion of the gas turbine engine 10 which is aft of the combustor 32 and the exhaust outlet 22 may be disposed in a portion of the gas turbine engine 10 which is forward of combustor 32. The exemplary configuration of gas turbine engine 10 of FIG. 1 may be referred to as a "reverse-flow free turbine engine." As indicated above, the present disclosure is not limited to this gas turbine engine 10 example and is not limited to gas turbine engines featuring a reverse air flow.

The gas turbine engine 10 of FIG. 1 further includes a compressor bleed assembly 46 configured to control a compressor of the compressor section 16 along a desired operating line during various operational conditions of the gas turbine engine 10. The compressor bleed assembly 46 of FIG. 1 includes a bleed-off valve (BOV) 48 and a pilot valve 50. The compressor bleed assembly 46 may further include a controller 52, however, the compressor bleed assembly 46 is not limited to the inclusion of a controller 52 for effecting operation of the compressor bleed assembly 46. The present disclosure, however, is not limited to the particular configuration of the compressor bleed assembly 46 of FIG. 1.

The bleed-off valve 48 is connected in fluid communication (e.g., using suitable conduits, pipes, tubes, etc.) with the core flow path 24 within the compressor section 16. For example, the bleed-off valve 48 of FIG. 1 is fluidly coupled with an intermediate stage of the compressor section 16 by a pressure relief line 54. The bleed-off valve 48 is configured to control (e.g., regulate) core gas flow along the core flow path 24, for example, by selectively re-ingesting core gas from the core flow path 24 to an upstream location in the compressor section 16 (e.g., proximate the air inlet 14) and/or by releasing the core gas to the surrounding atmosphere, based on operating conditions of the gas turbine engine 10. In other words, core gas (e.g., compressor bleed gas) from an intermediate stage of the compressor section 16 may flow through the pressure relief line 54 and may be re-ingested in an upstream section of the compressor section 16 and/or released to the surrounding atmosphere by the bleed-off valve 48. The bleed-off valve 48 may be positionable in a closed position, an open position, and a plurality of intermediate positions between the closed position and the open position, to control the release of the core gas from the core flow path 24. As an example, the bleed-off valve 48 may be opened at a relatively low rotational speed of the first rotational assembly 26 (e.g., a relatively low engine power condition) and may be closed at a relatively high rotational speed of the first rotational assembly 26 (e.g., a relatively high engine power condition).

The pilot valve 50 is connected in fluid communication (e.g., using suitable conduits, pipes, tubes, etc.) to the bleed-off valve 48. The pilot valve 50 is further connected in fluid communication (e.g., using suitable conduits, pipes, tubes, etc.) with a source of pressurized gas. For example, the pilot valve 50 of FIG. 1 is pilot valve 50 is further connected in fluid communication with the core flow path 24 immediately downstream of the compressor section 16. The pilot valve 50 is configured to control a flow of the pressurized gas (e.g., bleed air or bleed gas) to pneumatically control a position of the bleed-off valve 48. The pilot valve 50 may be configured, for example, as an active control solenoid valve controllable by an electrical or electronic control signal. Alternatively, the pilot valve 50 may be configured as a passive orifice network with orifices of various sizes which control the opening and closing point of the bleed-off valve 48.

The controller 52 of FIG. 1 is in communication (e.g., electrical or electronic signal communication) with the pilot valve 50. The controller 52 may control a position of the pilot valve 50 using an electrical control signal. The controller 52 may be configured to determine whether operating conditions of the gas turbine engine 10 satisfy criteria for directing core gas from the core flow path 24 with the bleed-off valve 48, for example, based on signals from one or more sensors (e.g., pressure sensors, temperature sensors, etc.) disposed within the compressor section 16. The controller 52 of FIG. 1 includes a processor 56 and memory 58. The memory 58 is in signal communication with the processor 56. The processor 56 may include any type of computing device, computational circuit, or any type of process or processing circuit capable of executing a series of instructions that are stored in the memory 58, thereby causing the processor 56 to perform or control one or more steps or other processes. The processor 56 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 58 may represent one or more algorithms for controlling aspects of the gas turbine engine 10, and the stored instructions are not limited to any particular form (e.g., program files, system data, buffers, drivers, utilities, system programs, etc.) provided they can be executed by the processor 56. The memory 658 may be a non-transitory computer readable storage medium configured to store instructions that when executed by one or more processors, cause the one or more processors to perform or cause the performance of certain functions. The memory 58 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 52 may be achieved via the use of hardware, software, firmware, or any combination thereof. The controller 52 may also include input and output devices (e.g., keyboards, buttons, switches, touch screens, video monitors, sensor readouts, data ports, etc.) that enable the operator to input instructions, receive data, etc.

The controller 52 may form or otherwise be part of an electronic engine controller (EEC) for the gas turbine engine 10. The EEC may control operating parameters of the gas turbine engine 10 including, but not limited to, fuel flow, stator vane position (e.g., variable compressor inlet guide vane (IGV) position), propeller rotation speed, propeller blade pitch, etc. so as to control an engine power and/or thrust of the gas turbine engine 10. In some embodiments, the EEC may be part of a full authority digital engine control (FADEC) system for the gas turbine engine 10.

Figure 2:
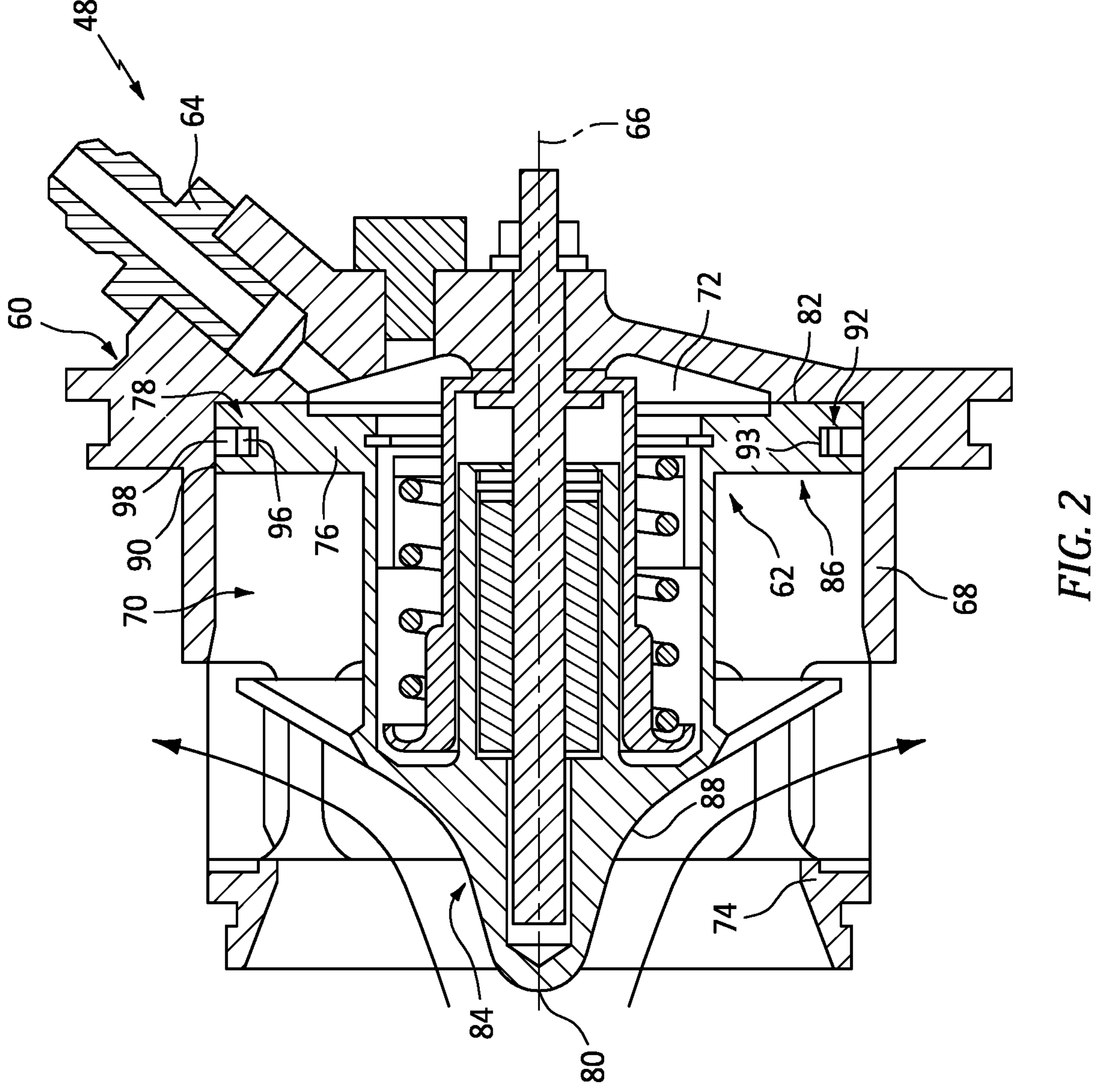
FIG. 2 illustrates a side, cutaway view of a bleed-off valve, in accordance with one or more embodiments of the present disclosure.

Referring to FIG. 2, an exemplary configuration of the bleed-off valve 48 is illustrated. The bleed-off valve 48 of FIG. 2 is configured as a poppet valve. The present disclosure, however, is not limited to the particular configuration of the bleed-off valve 48 illustrated in FIG. 2. The bleed-off valve 48 of FIG. 2 includes a housing 60, a piston 62, and an inlet 64.

The housing 60 extends circumferentially about (e.g., completely around) a centerline axis 66 of the bleed-off valve 48. The housing 60 includes a housing body 68. The housing body 68 surrounds the piston 62 and forms a piston chamber 70 within which the piston 62 moves along the centerline axis 66. The housing body 68 further forms an actuation cavity 72 between the piston 62 and the housing body 68. The housing body 68 includes a BOV seat 74. The BOV seat 74 is configured as an annular seat disposed axially adjacent the piston 62.

The piston 62 is configured to move (e.g., translate) withing the housing 60 along the centerline axis 66. The piston 62 includes a piston body 76 and a seal assembly 78. The piston body 76 extends between and to a first axial end 80 of the piston 62 and a second axial end 82 of the piston 62. The piston body 76 includes a first body portion 84 and a second body portion 86. The first body portion 84 is disposed at (e.g., on, adjacent, or proximate) the first axial end 80. The first body portion 84 includes a flow control surface 88. The flow control surface 88 faces and is configured to engage the BOV seat 74. The second body portion 86 is disposed at (e.g., on, adjacent, or proximate) the second axial end 82. The second body portion 86 includes an outer radial surface 90. The outer radial surface 90 is disposed at (e.g., on, adjacent, or proximate) the housing body 68. The second body portion 86 forms an annular seal groove 92 through the outer radial surface 90 to an inner diameter 93 of the seal groove 92 formed by the piston body 76 (e.g., the second body portion 86). The seal groove 92 extends circumferentially about (e.g., completely around) the centerline axis 66. The seal assembly 78 is disposed within the seal groove 92. The seal assembly 78 is configured to form a fluid seal between the piston 62 (e.g., the second body portion 86) and the housing 60 (e.g., the housing body 68) as the piston 62 moves within the housing 60. For example, the seal assembly 78 is configured to form a fluid seal for the actuation cavity 72. The piston 62 may include a spring or other biasing member configured to bias the piston 62 in an open position. However, the present disclosure is not limited to any particular biasing configuration for the piston 62. The seal assembly 78 includes a ring 96 and a seal 98.

The inlet 64 is connected in fluid communication (e.g., using suitable conduits, pipes, tubes, etc.) to the pilot valve 50. The inlet 64 is configured to receive the pressurized gas from the pilot valve 50 and direct the pressurized gas to the actuation cavity 72 for controlling a position of the bleed-off valve 48 (e.g., a position of the piston 62). For example, the pressurized gas from the pilot valve 50 is used to control an effective flow area 94 between the piston 62 (e.g., the flow control surface 88) and the BOV seat 74 to control (e.g., modulate) the compressor bleed gas flow from the compressor section 16.

Figure 4:
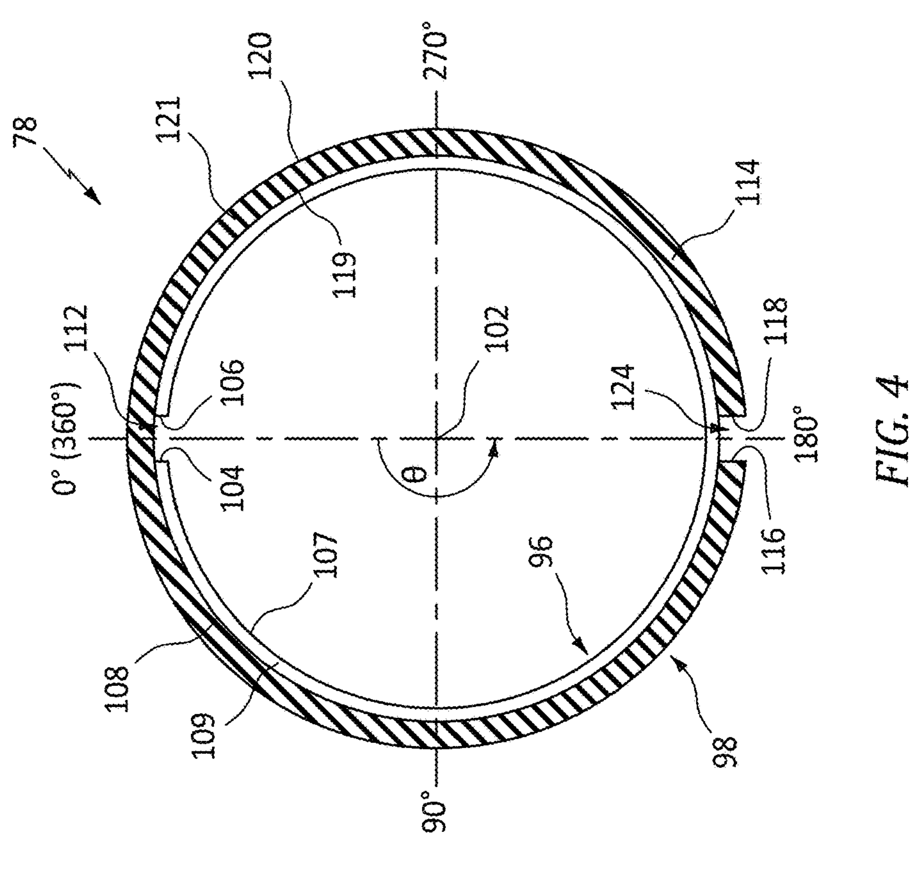
FIG. 4 illustrates a top view of another seal assembly, in accordance with one or more embodiments of the present disclosure.
Figure 3:
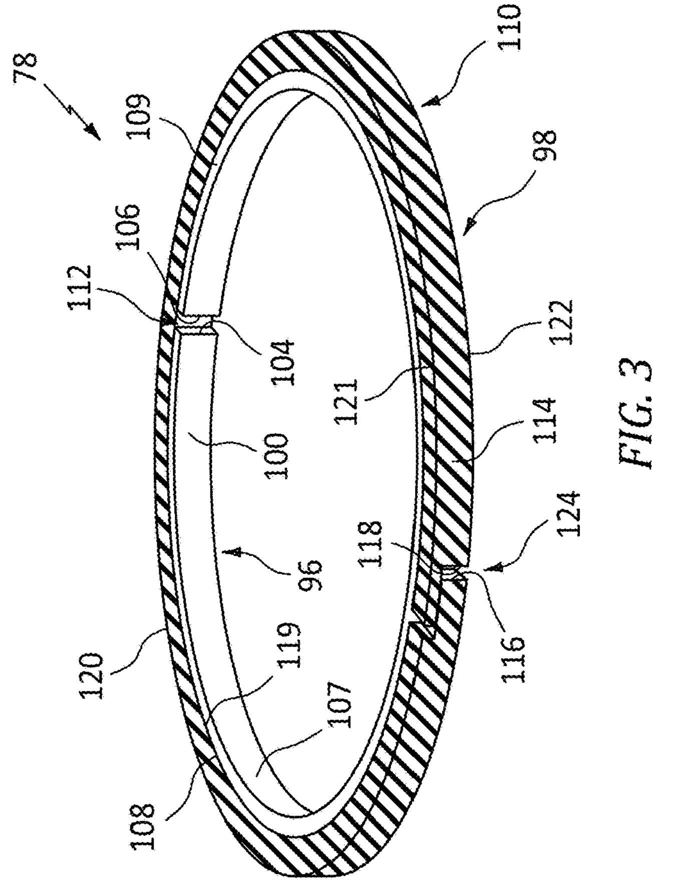
FIG. 3 illustrates a perspective view of a seal assembly, in accordance with one or more embodiments of the present disclosure.

Referring to FIGS. 3 and 4, an embodiment of the seal assembly 78 is illustrated. The seal assembly 78 of FIGS. 3 and 4 includes the ring 96 and the seal 98. The seal assembly 78 of the present disclosure is described herein with respect to the bleed-off valve 48, however, the present disclosure seal assembly is not limited to use with bleed-off valves, compressor bleed assemblies, or even gas turbine engines.

The ring 96 includes a ring body 100. The ring body 100 extends circumferentially about a centerline axis 102, which centerline axis 102 may be the same as or different than the centerline axis 66. The ring body 100 includes a first circumferential end 104, a second circumferential end 106, an inner radial side 107, an outer radial side 108, a first axial side 109, and a second axial side 110. The ring body 100 extends circumferentially between and to the first circumferential end 104 and the second circumferential end 106. Each of the inner radial side 107 and the outer radial side 108 extend circumferentially between and to the first circumferential end 104 and the second circumferential end 106. The ring body 100 forms an end gap 112 of the ring 96 between the first circumferential end 104 and the second circumferential end 106. The ring body 100 includes a ring body material. The ring body material may form all or a substantial portion of the ring body 100. The ring body material may be a metal material or another suitably rigid material. The present disclosure is not limited to the use of metal for the body material.

The seal 98 includes a seal body 114. The seal body 114 extends circumferentially about the centerline axis 102. The seal body 114 includes a first circumferential end 116, a second circumferential end 118, an inner radial side 119, an outer radial side 120, a first axial side 121, and a second axial side 122. The seal body 114 extends circumferentially between and to the first circumferential end 116 and the second circumferential end 118. Each of the inner radial side 119 and the outer radial side 120 extend circumferentially between and to the first circumferential end 116 and the second circumferential end 118. The first circumferential end 116 and the second circumferential end 118 may form a staggered step gap as shown, for example, in FIG. 3. The present disclosure, however, is not limited a staggered step gap for the first circumferential end 116 and the second circumferential end 118, and the first circumferential end 116 and the second circumferential end 118 may have any suitable configuration. The seal body 114 forms an end gap 124 of the seal 98 between the first circumferential end 116 and the second circumferential end 118. The seal body 114 includes a seal body material. The seal body material may form all or a substantial portion of the seal body 114. The seal body material may be different than the ring body material. Examples of the seal body material may include, but are not limited to, a plastic material, a composite material (e.g., a reinforced plastic material), an elastomeric material, or another suitably resilient material for forming a piston fluid seal. The present disclosure, however, is not limited to any particular material for the seal body material.

The seal body 114 is in contact with the ring body 100. For example, the seal body 114 circumscribes (e.g., radially circumscribes) the ring body 100 with the inner radial side 119 disposed at (e.g., on, adjacent, or proximate) the outer radial side 108. The seal body 114 may circumscribe (e.g., radially circumscribe) the ring body 100 from the first axial side 109 to the second axial side 110. In other words, the entire ring body 100 may be disposed radially inward of the seal body 114. The ring 96 supports and outwardly (e.g., radially outwardly) biases the seal 98 to maintain contact between the seal 98 and the housing body 68 (see FIG. 2).

The end gap 112 and the end gap 124 are configured to accommodate thermal expansion and contraction of the respective ring 96 and seal 98 throughout an operating temperature range associated with operation of the bleed-off valve 48 and/or the gas turbine engine 10. For example, the end gap 112 and the end gap 124 may facilitate expansion and contraction of the respective ring 96 and seal 98 while maintaining contact between the ring body 100 (e.g., the outer radial side 108) and the seal body 114 (e.g., the inner radial side 119) to ensure proper sealing relative to the housing body 68 (see FIG. 2).

In operation, some amount of fluid (e.g., pressurized gas) may leak through the seal assembly 78. As shown in FIG. 4, the end gap 112 has a first circumferential position and the end gap 124 has a second circumferential position, which second circumferential position is different than the first circumferential position. Thus, the end gap 112 may be circumferentially offset from the end gap 124. Offsetting the end gap 112 from the end gap 124 may facilitate a reduction in an amount of fluid which leaks through the seal assembly 78. The end gap 112 is circumferentially offset from the end gap 124 by an offset angle Θ. A magnitude of the offset angle Θ may affect leakage characteristics for the seal assembly 78. For example, a seal assembly having an offset angle Θ of zero degrees)(0° (e.g., circumferentially aligned) may exhibit a greater amount of leakage in comparison to a seal assembly having an offset angle Θ of 180 degrees (180°). In some seal assemblies, an offset angle Θ of 180 degrees (180°) may be an optimal offset angle Θ for the purpose of minimizing leakage through the seal assembly. For example, offset angle Θ may be selected from an offset angle Θ range between 160 degrees (160°) and 200 degrees (200°), between 135 degrees (135°) and 225 degrees (225°), or between 90 degrees (90°) and 270 degrees (270°). The present disclosure, however, is not limited to any particular value of the offset angle Θ between the end gap 112 and the end gap 124, and offset angles Θ outside of the above-indicated exemplary offset angle Θ ranges may also be implemented for the seal assembly 78.

In operation, vibration or other motion experienced by the seal assembly 78 may cause relative circumferential movement (e.g., rotation about the centerline axis 102) between the ring 96 and the seal 98. This relative circumferential movement may, in turn, lead to a change in the offset angle Θ between the end gap 112 and the end gap 124 over time. This change in the offset angle Θ may also change the leakage characteristics of the seal assembly 78, thereby affecting the operating characteristics of the bleed-off valve 48 (e.g., degraded piston 62 performance). For example, the seal assembly 78 may initially be installed on the piston 62 with the end gap 112 and the end gap 124 having an offset angle Θ of 180 degrees (180°). During operation of the gas turbine engine 10 and the bleed-off valve 48, the offset angle Θ may gradually change from the initial 180 degree (180°) offset angle Θ to a 90 degree (90°) offset angle Θ, which decrease in the offset angle Θ may cause an increase in leakage through the seal assembly 78.

Referring to FIGS. 5-8, embodiments of the seal assembly 78 further including an anti-rotation feature 126 are illustrated. The anti-rotation features 126 of FIGS. 5-8 are positioned (e.g., in engagement between the ring 96 and the seal 98) to limit relative circumferential movement between the ring 96 (e.g., the ring body 100) and the seal 98 (e.g., the seal body 114). The anti-rotation feature 126 may be engaged (e.g., physically in contact with) one or both of the ring body 100 and the seal body 114. The anti-rotation feature 126 may be formed, for example, by the ring 96 (e.g., the ring body 100) and/or the seal 98 (e.g., the seal body 114). The anti-rotation feature 126 is configured to prevent or otherwise limit relative circumferential movement between the ring 96 and the seal 98, thereby preventing or otherwise limiting changes in the offset angle Θ (e.g., to maintain the offset angle Θ for the seal assembly 78 constant or substantially constant) (see FIG. 4) and, consequently, to maintain the leakage characteristic of the seal assembly 78.

Figures 5, 6:
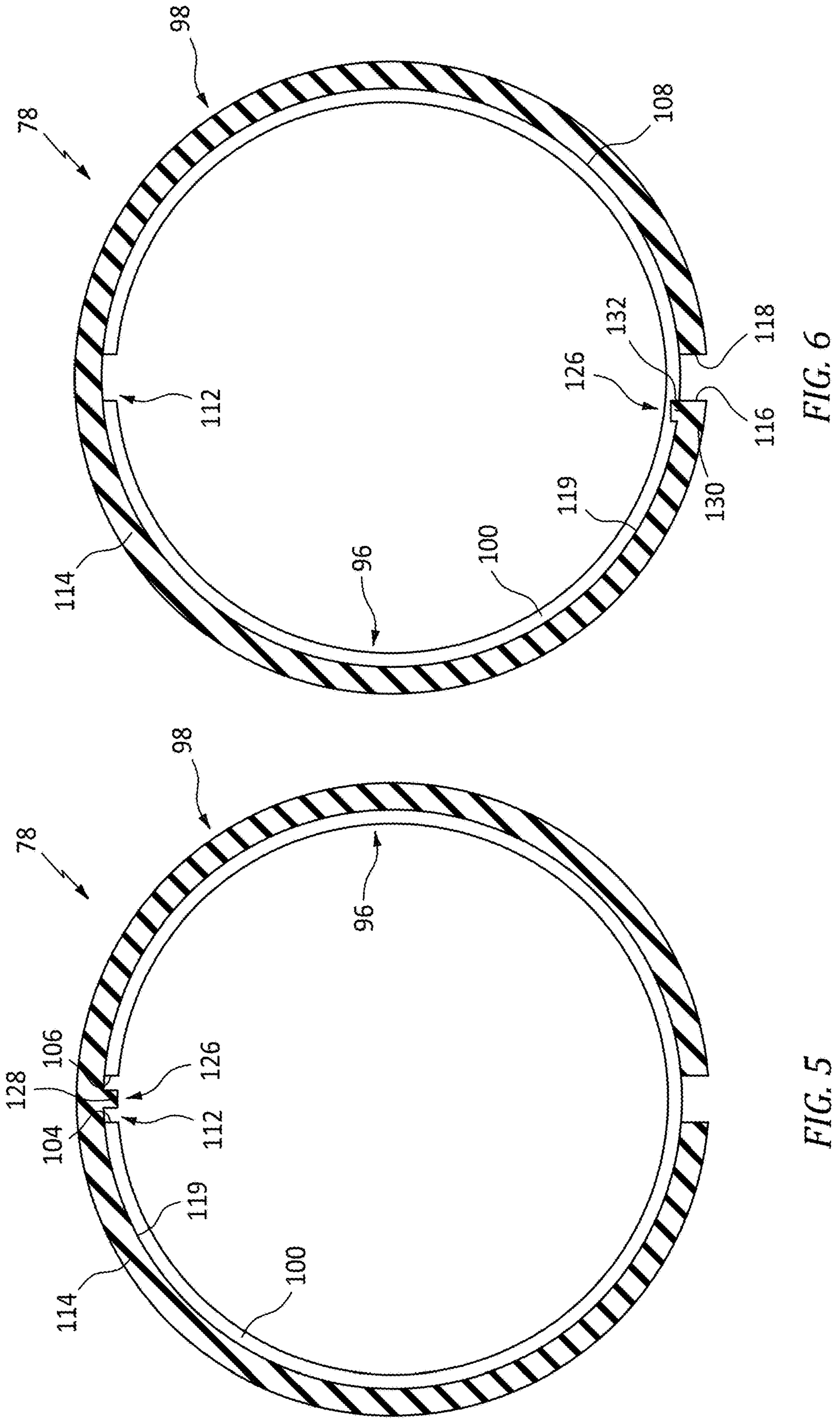
FIG. 5 illustrates a top view of a seal assembly including an anti-rotation feature, in accordance with one or more embodiments of the present disclosure.
FIG. 6 illustrates a top view of another seal assembly including an anti-rotation feature, in accordance with one or more embodiments of the present disclosure.

Referring to FIG. 5, the seal 98 forms a protrusion 128 of the anti-rotation feature 126 of FIG. 5. The protrusion 128 extends inward (e.g., radially inward) from the inner radial side 119. The protrusion 128 may be mounted on or otherwise attached to the seal body 114. Alternatively, the protrusion 128 may be formed by the seal body 114 (e.g., the protrusion 128 may be an integral portion of the seal body 114). The protrusion 128 may be configured, for example, as a pin, post, rail, or other body extending inward from a portion of the seal body 114. The protrusion 128 may be configured, for example, as a localized deviation in the circumferential shape of a portion (e.g., a crimped portion) of the seal body 114. The present disclosure is not limited to any particular shape or configuration of the protrusion 128. The protrusion 128 is disposed within (e.g., radially and circumferentially within) the end gap 112. In other words, the protrusion 128 is disposed circumferentially between the first circumferential end 104 and the second circumferential end 106. The first circumferential end 104 and the second circumferential end 106 limit circumferential movement of the seal 98 relative to the ring 96 by obstructing circumferential movement of the protrusion 128. As shown in FIG. 5, the protrusion 128 may have a circumferential span which is less than a corresponding circumferential span of the end gap 112. The protrusion 128 may, therefore, accommodate thermal expansion and contraction of the ring body 100 while also limiting relative circumferential movement (e.g., within a threshold rotation limit) between the ring 96 and the seal 98. The present disclosure, however, is not limited to this particular configuration of the protrusion 128 and the end gap 112.

Referring to FIG. 6, the seal 98 forms a protrusion 130 of the anti-rotation feature 126 of FIG. 6 and the ring 96 forms a slot 132 of the anti-rotation feature 126 of FIG. 6. The protrusion 130 extends inward (e.g., radially inward) from the inner radial side 119 at (e.g., on, adjacent, or proximate) the first circumferential end 116. The present disclosure, however, is not limited to any particular circumferential position of the protrusion 130 relative to the seal 98. The protrusion 130 may be mounted on or otherwise attached to the seal body 114. Alternatively, the protrusion 130 may be formed by the seal body 114 (e.g., the protrusion 130 may be an integral portion of the seal body 114). The protrusion 130 may be configured, for example, as a pin, post, rail, or other body extending inward from a portion of the seal body 114. The protrusion 130 may be configured, for example, as a localized deviation in the circumferential shape of a portion (e.g., a crimped portion) of the seal body 114. The present disclosure is not limited to any particular shape or configuration of the protrusion 130. The protrusion 130 is disposed within the slot 132. The slot 132 is formed by the ring body 100. For example, the slot 132 of FIG. 6 is formed through the outer radial side 108 of the ring body 100. The ring body 100 limits circumferential movement of the seal 98 relative to the ring 96 by obstructing circumferential movement of the protrusion 130 disposed within the slot 132. As shown in FIG. 6, the protrusion 130 may have a shape which is substantially the same as a corresponding shape of the slot 132. The protrusion 130 may fit securely within the slot 132 to substantially prevent relative circumferential movement between the ring 96 and the seal 98. The present disclosure, however, is not limited to this particular configuration of the protrusion 130 and the slot 132, and the protrusion 130 and the slot 132 may alternatively be sized to allow some limited relative circumferential movement (e.g., within a threshold rotation limit) between the ring 96 and the seal 98 and/or to accommodate thermal expansion and contraction of the ring body 100 and/or the seal body 114.

Figures 7, 8:
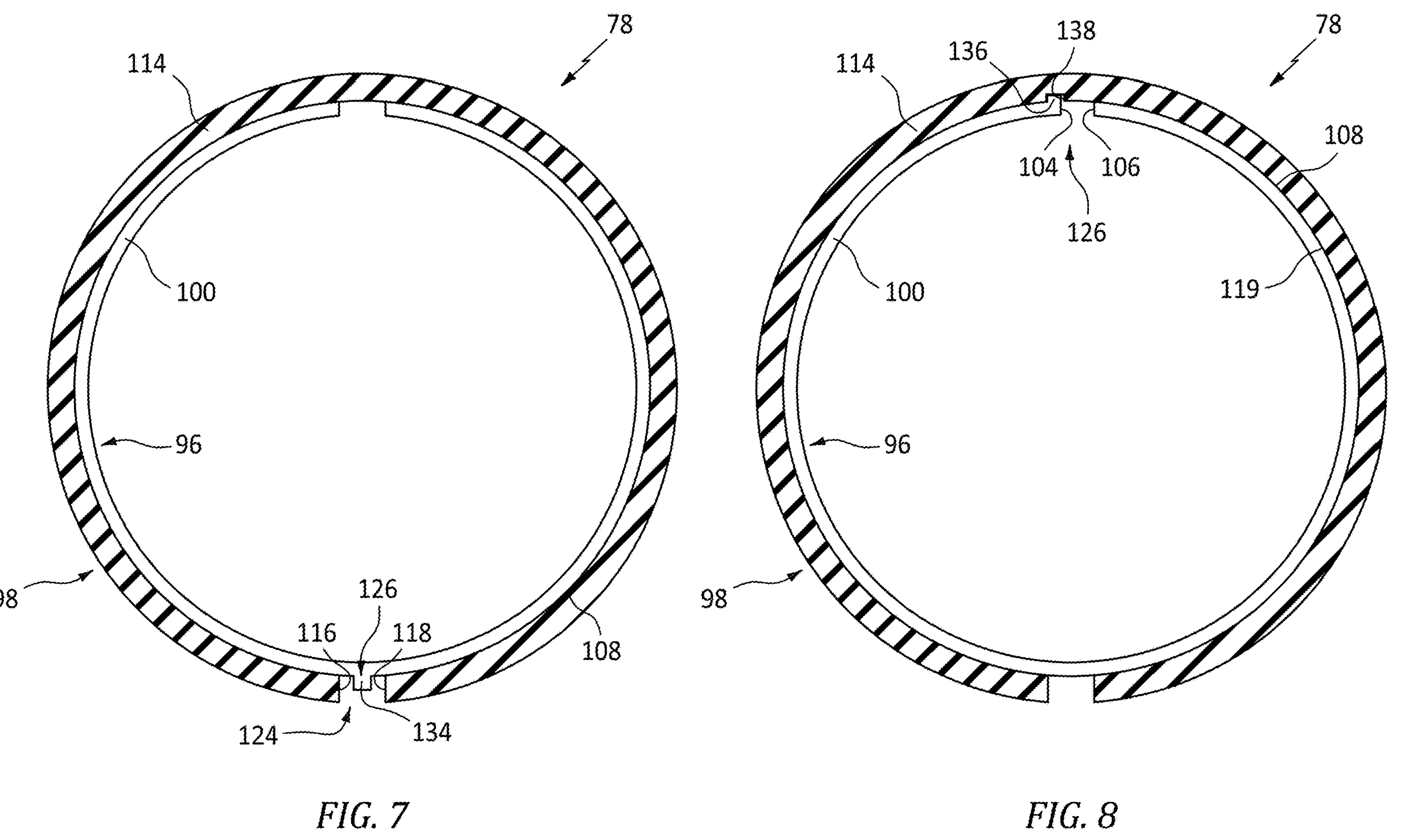
FIG. 7 illustrates a top view of another seal assembly including an anti-rotation feature, in accordance with one or more embodiments of the present disclosure.
FIG. 8 illustrates a top view of another seal assembly including an anti-rotation feature, in accordance with one or more embodiments of the present disclosure.

Referring to FIG. 7, the ring 96 forms a protrusion 134 of the anti-rotation feature 126 of FIG. 7. The protrusion 134 extends outward (e.g., radially outward) from the outer radial side 108. The protrusion 134 may be mounted on or otherwise attached to the ring body 100. Alternatively, the protrusion 134 may be formed by the ring body 100 (e.g., the protrusion 134 may be an integral portion of the ring body 100). The protrusion 134 may be configured, for example, as a pin, post, rail, or other body extending outward from a portion of the ring body 100. The protrusion 134 may be configured, for example, as a localized deviation in the circumferential shape of a portion (e.g., a crimped portion) of the ring body 100. The present disclosure is not limited to any particular shape or configuration of the protrusion 134. The protrusion 134 is disposed within (e.g., radially and circumferentially within) the end gap 124. In other words, the protrusion 134 is disposed circumferentially between the first circumferential end 116 and the second circumferential end 118. The first circumferential end 116 and the second circumferential end 118 limit circumferential movement of the seal 98 relative to the ring 96 by obstructing circumferential movement of the protrusion 134. As shown in FIG. 7, the protrusion 134 may have a circumferential span which is less than a corresponding circumferential span of the end gap 124. The protrusion 134 may, therefore, accommodate thermal expansion and contraction of the seal body 114 while also limiting relative circumferential movement (e.g., within a threshold rotation limit) between the ring 96 and the seal 98. The present disclosure, however, is not limited to this particular configuration of the protrusion 134 and the end gap 124.

Referring to FIG. 8, the ring 96 forms a protrusion 136 of the anti-rotation feature 126 of FIG. 8 and the seal 98 forms a slot 138 of the anti-rotation feature 126 of FIG. 8. The protrusion 136 extends outward (e.g., radially outward) from the outer radial side 108 at (e.g., on, adjacent, or proximate) the first circumferential end 104. The present disclosure, however, is not limited to any particular circumferential position of the protrusion 136 relative to the ring 96. The protrusion 136 may be mounted on or otherwise attached to the ring body 100. Alternatively, the protrusion 136 may be formed by the ring body 100 (e.g., the protrusion 136 may be an integral portion of the ring body 100). The protrusion 136 may be configured, for example, as a pin, post, rail, or other body extending inward from a portion of the ring body 100. The protrusion 136 may be configured, for example, as a localized deviation in the circumferential shape of a portion (e.g., a crimped portion) of the ring body 100. The present disclosure is not limited to any particular shape or configuration of the protrusion 136. The protrusion 136 is disposed within the slot 138. The slot 138 is formed by the seal body 114. For example, the slot 138 of FIG. 8 is formed through the inner radial side 119 of the seal body 114. The seal body 114 limits circumferential movement of the ring 96 relative to the seal 98 by obstructing circumferential movement of the protrusion 136 disposed within the slot 138. As shown in FIG. 8, the protrusion 136 may have a shape which is substantially the same as a corresponding shape of the slot 138. The protrusion 136 may fit securely within the slot 138 to substantially prevent relative circumferential movement between the ring 96 and the seal 98. The present disclosure, however, is not limited to this particular configuration of the protrusion 136 and the slot 138, and the protrusion 136 and the slot 138 may alternatively be sized to allow some limited relative circumferential movement (e.g., within a threshold rotation limit) between the ring 96 and the seal 98 and/or to accommodate thermal expansion and contraction of the ring body 100 and/or the seal body 114.

Figure 10:
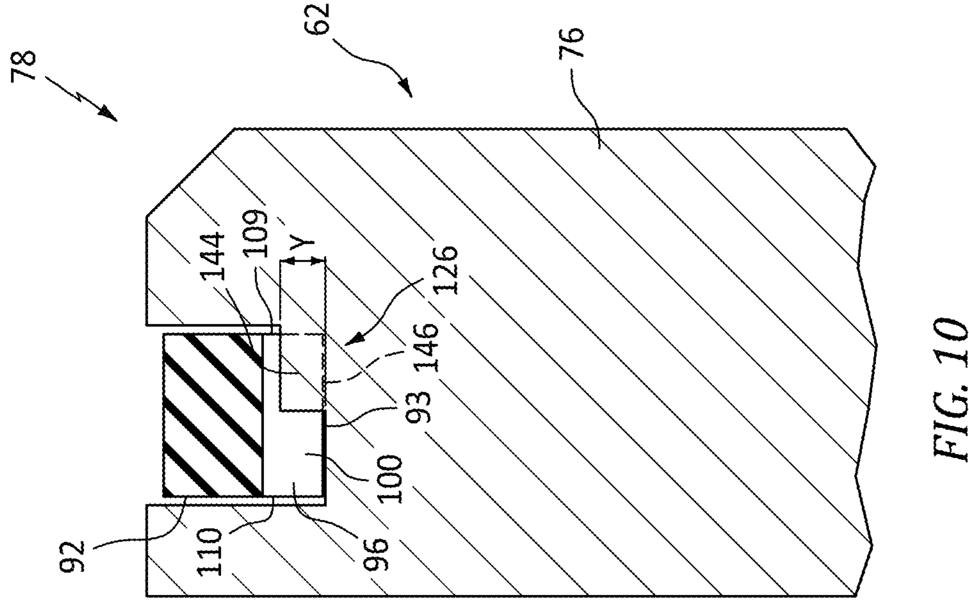
FIG. 10 illustrates a side, cutaway view of another seal assembly including an anti-rotation feature, in accordance with one or more embodiments of the present disclosure.
Figure 9:
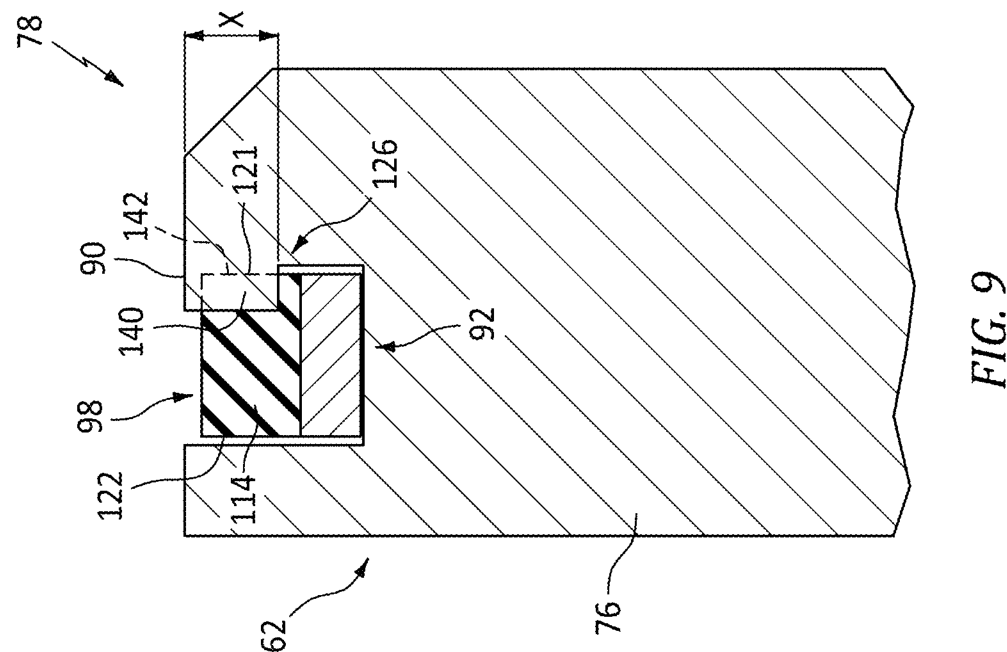
FIG. 9 illustrates a side, cutaway view of another seal assembly including an anti-rotation feature, in accordance with one or more embodiments of the present disclosure.

Referring to FIGS. 9-10, additional embodiments of the seal assembly 78 and its anti-rotation feature 126 are illustrated. The seal assembly 78 embodiments of FIGS. 9 and 10 further include portions of the piston 62 (e.g., the piston body 76), which piston may further form the anti-rotation feature 126.

Referring to FIG. 9, the piston 62 (e.g., the piston body 76) forms a tab 140 of the anti-rotation feature 126 of FIG. 9 and the seal 98 (e.g., the seal body 114) forms a slot 142 of the anti-rotation feature 126 of FIG. 9. The piston body 76 forms the tab 140 at a circumferential position of the piston body 76. The tab 140 extends axially into the seal groove 92. The tab 140 extends radially inward from the outer radial surface 90. The tab 140 extends radially inward up to a radial distance X from the outer radial surface 90. The seal body 114 forms the slot 142 extending (e.g., axially extending) through the seal body 114 from the first axial side 121 toward the second axial side 122 (e.g., a portion of the axial distance from the first axial side 121 to the second axial side 122). The seal body 114 is positioned within the seal groove 92 so that the tab 140 is disposed within the slot 142. The tab 140 limits circumferential movement of the seal 98 relative to the ring 96 by obstructing circumferential movement of the seal body 114. The tab 140 and the slot 142 of FIG. 9 are illustrated and described as interfacing at (e.g., on, adjacent, or proximate) the first axial side 121, however, the tab 140 and the slot 142 may alternatively be applied to interface at (e.g., on, adjacent, or proximate) the second axial side 122.

Referring to FIG. 10, the piston 62 (e.g., the piston body 76) forms a tab 144 of the anti-rotation feature 126 of FIG. 10 and the ring 96 (e.g., the ring body 100) forms a slot 146 of the anti-rotation feature 126 of FIG. 10. The tab 144 and slot 146 of FIG. 10 may be used in combination with the tab 140 and slot 142 of FIG. 9, however, the present disclosure is not limited to such a combination. The piston body 76 forms the tab 144 at a circumferential position of the piston body 76. For example, the piston body 76 may form the tab 144 at (e.g., on, adjacent, or proximate) the circumferential position of the tab 140. The tab 144 extends axially into the seal groove 92. The tab 144 extends radially outward from the inner diameter 93. The tab 144 extends radially outward up to a radial distance Y from the inner diameter 93. Values of the radial distance X and the radial distance Y may be selected, for example, to properly constrain (e.g., prevent or limit relative circumferential movement) the ring 96 and the seal 98, without the ring 96 and the seal 98 interfering with one another (e.g., as a result of thermal expansion or other forces causing radial displacement of the ring 96 and/or the seal 98). The ring body 100 forms the slot 146 extending (e.g., axially extending) through the ring body 100 from the first axial side 109 toward the second axial side 110 (e.g., a portion of the axial distance from the first axial side 109 to the second axial side 110). The ring body 100 is positioned within the seal groove 92 so that the tab 144 is disposed within the slot 146. The tab 144 limits circumferential movement of the ring 96 relative to the seal 98 by obstructing circumferential movement of the ring body 100. The tab 144 and the slot 146 of FIG. 10 are illustrated and described as interfacing at (e.g., on, adjacent, or proximate) the first axial side 109, however, the tab 144 and the slot 146 may alternatively be applied to interface at (e.g., on, adjacent, or proximate) the second axial side 110.

Referring again to FIG. 4, and as previously discussed, embodiments of the anti-rotation feature 126 of the present disclosure may limit relative circumferential movement (e.g., rotation about the centerline axis 102) between the ring 96 and the seal 98. In other words, the anti-rotation feature 126 may allow some amount of acceptable relative circumferential movement (e.g., rotation about the centerline axis 102) between the ring 96 and the seal 98, within a threshold rotation limit for the anti-rotation feature 126. The threshold rotation limit may be understood as an allowable amount of relative circumferential movement between the ring 96 and the seal 98, as limited by the anti-rotation feature 126. As also previously discussed, a magnitude of the offset angle Θ between the end gap 112 and the end gap 124 may affect leakage characteristics for the seal assembly 78. For example, leakage through the seal assembly 78 may be expected to increase as the offset angle Θ decreases from 180 degrees (180°) toward zero degrees (0°) or increases from 180 degrees (180°) toward 360 degrees)(360° (e.g., as the end gap 112 and the end gap 124 become circumferentially closer together). The threshold rotation limit for the anti-rotation feature 126 may, therefore, be selected to limit a change in the leakage of the seal assembly 78 during operation (e.g., operation of the bleed-off valve 48, the gas turbine engine 10, etc.), so maintain consistent leakage and operating characteristics for the seal assembly 78. As an example, the threshold rotation limit for the anti-rotation feature 126 may be a range of 10 degrees)(10° (e.g., +/−5 degrees) (5°), or more preferably a range of 5 degrees)(5° (e.g., +/−2.5 degrees) (2.5°), or still more preferably a range of 2 degrees)(2° (e.g., +/−1 degrees) (1°).

A change in expected leakage through the seal assembly 78 may also vary for different offset angle Θ ranges. For example, a change in the offset angle Θ of a seal assembly 78 from 50 degrees (50°) to 40 degrees (40°) may effect a greater increase in leakage through the seal assembly 78 than a change in the offset angle Θ of the seal assembly 78 from 180 degrees (180°) to 170 degrees (170°). As such, the threshold rotation limit for the anti-rotation feature 126 may be selected based on the offset angle Θ for the seal assembly 78. An acceptable range of the threshold rotation limit may decrease as the offset angle Θ decreases from 180 degrees (180°) toward zero degrees (0°) or increases from 180 degrees (180°) toward 360 degrees)(360° (e.g., as the end gap 112 and the end gap 124 become circumferentially closer together). As an example, for an offset angle Θ range of 90 degrees (90°) to 270 degrees (270°), the threshold rotation limit may be a range of 10 degrees)(10° (e.g., +/−5 degrees) (5°). As another example, for an offset angle Θ range of 45 degrees (45°) to 90 degrees (90°) or 270 degrees (270°) to 315 degrees (315°), the threshold rotation limit may be a range of 5 degrees)(5° (e.g., +/−2.5 degrees)) (2.5°. As another example, for an offset angle Θ range of 0(0°) degrees to 45 degrees (45°) or 315 degrees (315°) to 360 degrees (360°), the threshold rotation limit may be a range of 2 degrees) (2° (e.g., +/−1 degrees) (1°).

It should be understood that the above-described threshold rotation limits are exemplary, and the present disclosure is not limited to these particular values or ranges of the threshold rotation limits or associated offset angle Θ ranges. Threshold rotation limits may be selected for a seal assembly based on acceptable leakage and operational criteria which may be identified for a seal assembly and associated equipment (e.g., a bleed-off valve piston). Threshold rotation limits may be determined for a particular set of seal assembly operating conditions. For example, threshold rotation limits for a seal assembly anti-rotation feature, such as those described above, may be identified for a seal assembly at a maximum normal operating temperature (e.g., having minimum end gap sizes) while also constrained in a sealing condition (e.g., between the piston body 76 and the housing body 68). The present disclosure, however, is not limited to any particular set of seal assembly operating conditions for identifying threshold rotation limits for a seal assembly anti-rotation feature.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A bleed-off valve for an aircraft gas turbine engine, the bleed-off valve comprising:

a housing extending circumferentially about a centerline axis of the bleed-off valve;

a piston disposed within the housing, the piston configured to translate along the centerline axis, the piston including a piston body forming an annular seal groove; and a piston seal assembly comprising:

a ring including a ring body, the ring body extending circumferentially about a centerline axis of the piston seal assembly, the ring body extending radially between and to an outer radial ring side and an inner radial ring side, the ring body extending circumferentially between and to a first circumferential ring end and a second circumferential ring end, the ring body forming a ring end gap of the ring between the first circumferential ring end and the second circumferential ring end, the first circumferential ring end extending from the outer radial ring side and the inner radial ring side, and the second circumferential ring end extending from the outer radial ring side and the inner radial ring side; and a seal including a seal body, the seal body extending circumferentially about the centerline axis, the seal body extending radially between and to an outer radial seal side and an inner radial seal side, the seal body radially circumscribing the ring body with the inner radial seal side disposed on the outer radial ring side, the seal body extending circumferentially between and to a first circumferential seal end and a second circumferential seal end, the seal body forming a seal end gap of the seal between the first circumferential seal end and the second circumferential seal end, the first circumferential seal end extending from the outer radial seal side and the inner radial seal side, the second circumferential seal end extending from the outer radial seal side and the inner radial seal side, the seal body circumferentially continuously contacts the ring body from the first circumferential seal end to the first circumferential ring end, and the seal body circumferentially continuously contacts the ring body from the second circumferential seal end to the second circumferential ring end;

the ring body and the seal body forming an anti-rotation feature of the piston seal assembly, the anti-rotation feature configured to limit relative circumferential movement between the ring body and the seal body;

wherein the anti-rotation feature includes a protrusion extending radially outward from the outer radial ring side;

wherein the ring end gap is circumferentially offset from the seal end gap by an offset angle Θ;

wherein the ring end gap has a first circumferential position, the seal end gap has a second circumferential position, and the anti-rotation feature is configured to limit relative motion between the first circumferential position and the second circumferential position within a threshold rotation limit to provide a leakage characteristic of the piston seal assembly; and wherein the threshold rotation limit is within a range of two degrees (2°) and ten degrees (10°).

2. The bleed-off valve of claim 1, wherein the offset angle Θ is between 160 degrees and 200 degrees.

3. The bleed-off valve of claim 1, wherein the protrusion is disposed within the seal end gap.

4. The bleed-off valve of claim 1, wherein the ring body includes a first rigid body material, the seal body includes a second resilient body material, and the first rigid body material is different than the second resilient body material.

5. The bleed-off valve of claim 1, wherein the range of the threshold rotation limit is based on a magnitude of the offset angle Θ.

6. The bleed-off valve of claim 4, wherein the first rigid body material comprises a metal material and the second resilient body material comprises a plastic material, a composite material, or an elastomeric material.

* * * * *